United States Patent
Schnell et al.

[11] Patent Number: 5,285,013
[45] Date of Patent: Feb. 8, 1994

[54] NON-METALLIC ELECTRICAL CONDUIT CONNECTOR

[75] Inventors: Kenneth R. Schnell; Gregory J. Kesler, both of South Bend, Ind.

[73] Assignee: Hubbell Incorporated, Orange, Conn.

[21] Appl. No.: 885,663

[22] Filed: May 19, 1992

[51] Int. Cl.[5] .......................... F16L 5/00; H02G 3/18
[52] U.S. Cl. ................................. 174/65 R; 285/162
[58] Field of Search .............. 174/65 R, 65 G, 153 R, 174/153 G; 285/158, 162

[56] References Cited

U.S. PATENT DOCUMENTS

| | | | |
|---|---|---|---|
| 2,420,826 | 5/1947 | Irrgang | 174/153 |
| 2,952,730 | 9/1960 | Simonds | 174/153 |
| 3,631,738 | 1/1970 | Harper | 285/162 X |
| 4,248,459 | 2/1981 | Pate et al. | 285/319 |
| 4,302,035 | 11/1981 | Ochwat | 285/158 |
| 4,494,779 | 1/1985 | Neff et al. | 285/159 |
| 4,578,528 | 3/1986 | Borsh et al. | 174/65 |
| 4,616,105 | 10/1986 | Borsh | 174/65 |
| 4,711,472 | 12/1987 | Schnell | 285/162 |
| 4,864,080 | 9/1989 | Fochler et al. | 174/65 |
| 5,068,496 | 11/1991 | Favalora | 285/162 X |
| 5,204,499 | 4/1993 | Favalora | 174/65 R |

*Primary Examiner*—Timothy V. Eley
*Assistant Examiner*—Khan V. Nguyen
*Attorney, Agent, or Firm*—Jerry M. Presson; David L. Tarnoff; Alfred N. Goodman

[57] ABSTRACT

A connector for coupling non-metallic electrical conduit or tubing within an electrical box opening that is molded of plastic and is flexible and resilient and can be used with either plastic or steel electric boxes. The connector includes a ring, four legs resiliently and pivotally coupled to the ring with adjacent pairs of legs defining a slot therebetween, and four latch tabs located within the slots and flexibly and resiliently coupled to the ring for retaining the conduit within the connector and angled inwardly and extending away from the ring. Each leg has an arcuate groove therein for locking the connector within an aperture of an electrical box, and the legs form a stop wall for limiting insertion of the conduit within the connector. Each leg has a transverse arm which spans one of the slots. As the connector is being inserted into the aperture of the electrical box, each arm slidably engages the next adjacent leg. Once the connector is fully inserted into the electrical box and conductors have been fed through the conduit, the arms protect the conductors from being damaged by the electrical box.

25 Claims, 4 Drawing Sheets

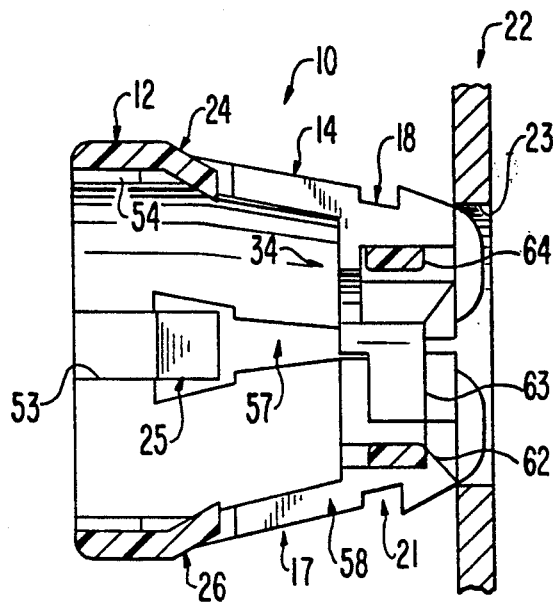
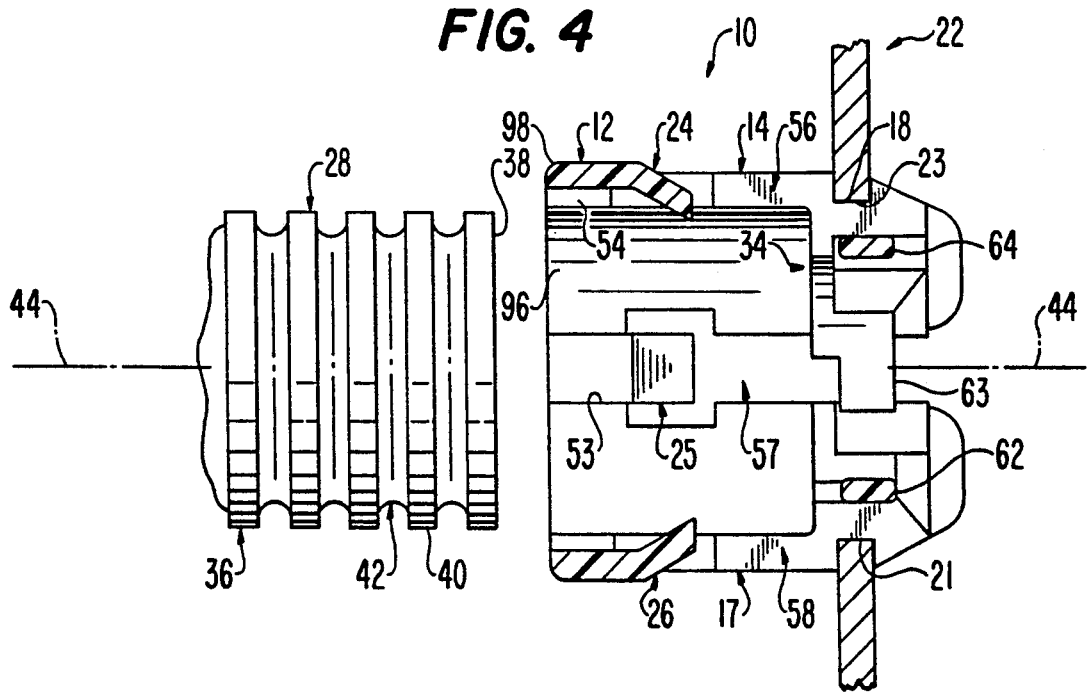

NON-METALLIC ELECTRICAL CONDUIT CONNECTOR

FIELD OF THE INVENTION

The invention relates to a connector for non-metallic electrical conduit or tubing. More particularly, the invention relates to a connector for electrical conduit having a ring, a plurality of legs pivotally and resiliently coupled to the ring, an arcuate groove on each leg for locking the connector in position relative to an electrical box, a slot between each adjacent pair of the legs, and latch tabs pivotally and resiliently coupled to the ring, angled inwardly and extending away from the ring and located in the slots. The legs resiliently pivot, thereby allowing the connector to be inserted into the aperture of an electrical box and held in position by the arcuate grooves. Thereafter, the electrical conduit can be inserted into the connector through the ring and is held in position by the latch tabs. Electrical conductors can then be fed through the conduit and into the electrical box.

BACKGROUND OF THE INVENTION

In many commercial or residential facilities, electrical conductors are typically encased in various types of conduits or tubing. The conduit is often corrugated and constructed so that it may be easily bent or curved to facilitate selective directional positioning of the electrical conductors and the conduit as required in the course of installation.

In systems of the type described which include electrical boxes and externally corrugated conduits in which the electrical conductors are enclosed, a means of connecting the conduit to the box is required. Many attempts have been made in the past to provide connectors for this type of corrugated conduit; however, they have several disadvantages. For one thing, steel electrical boxes are preferred in the industry, but some of the prior connectors are not flexible and/or resilient enough to be inserted into steel electrical boxes and can only be used when inserted into plastic boxes. Second, some of the prior devices do not protect the conductors from scraping against the electric box. Finally, many of these prior electrical corrugated conduit connectors do not provide for simple and quick connection of the conduit within the connector.

Examples of these prior connectors are disclosed in the following U.S. Pat. Nos. 2,420,826 to Irrgang; 2,952,730 to Simonds; 4,248,459 to Pale et al; 4,302,035 to Ochwat; 4,494,779 to Neff et al; 4,578,528 to Borsh et al; 4,616,105 to Borsh; 4,711,474 to Schnell; and 4,864,080 to Fochler et al.

Thus, there is a continuing need to provide improved non-metallic electrical conduit connectors.

SUMMARY OF THE INVENTION

Accordingly, it is a primary object to provide a flexible, resilient and one-piece non-metallic electrical conduit connector.

Another object of the invention is to provide an electrical conduit connector that can be used with either plastic or metal electric boxes.

Another object of the invention is to provide an electrical conduit connector that protects the electrical conductors from being damaged by the electric box.

Another object of the invention is to provide an electrical conduit connector in which the corrugated conduit is simply and easily latched into position by flexible and resilient latch tabs.

A further object of the invention is to provide a one-piece connector that can be molded from plastic.

The foregoing objects are basically attained by providing a connector for electrical conduit, the combination comprising a ring; a plurality of legs, each of the legs having a locking member thereon; a mechanism, coupled to the ring and the legs, for pivotally and resiliently coupling the ring and the legs; and a member, coupled to the ring, for retaining a conduit thereon; adjacent pairs of the legs defining a slot therebetween; the member for retaining being located in the slots and angled inwardly relative to the ring and extending away from the ring.

The foregoing objects are also attained by providing a connector for electrical conduit, the combination comprising a ring; a plurality of legs, each of the legs having a locking member thereon; a mechanism, coupled to the ring and the legs, for pivotally and resiliently coupling the ring and the legs; a member, coupled to the ring, for retaining a conduit thereon; and a stop, formed on the legs, for limiting insertion of the conduit therein, adjacent pairs of the legs defining a slot therebetween, the member for retaining being located in the slots and angled inwardly relative to the ring and extending away from the ring, the stop having arms, one of said arms spanning each of said slots, each of said arms being rigidly coupled to one of said legs and slidably engageable with the next adjacent leg.

Other objects, advantages and salient features of the invention will become apparent from the following detailed description, which, taken in conjunction with the annexed drawings, discloses a preferred embodiment of the invention.

BRIEF DESCRIPTION OF THE DRAWINGS

Referring now to drawings which form a part of this original disclosure:

FIG. 3 is a side elevational view of the connector being inserted into the electrical box in longitudinal section taken along line 3—3 of FIG. 1;

FIG. 4 is a side elevational view of the connector after being inserted into the electrical box in longitudinal section taken along line 3—3 of FIG. 1 and with the conduit about to be inserted into the connector;

DETAILED DESCRIPTION OF THE INVENTION

Figure 1:
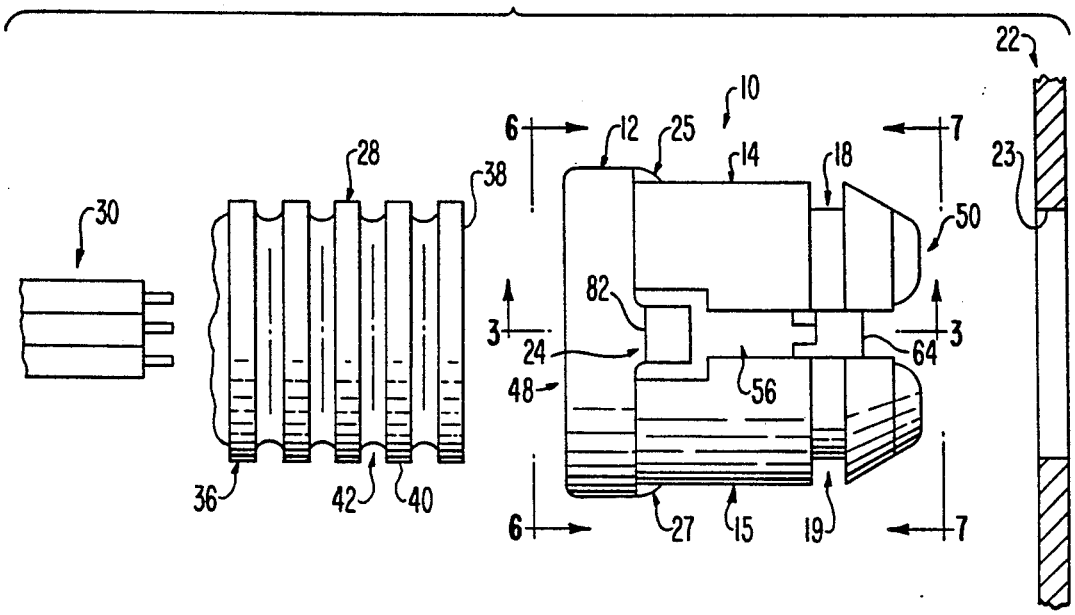
FIG. 1 is an exploded side elevational view of the connector in accordance with the invention with the connector about to be inserted into an electrical box and with the conduit about to be latched into the connector and the electrical conductors about to be inserted into the conduit.

As seen in FIGS. 1-5, the non-metallic electrical conduit connector 10 in accordance with the invention comprises a ring 12, a plurality of legs 14-17 pivotally and resiliently coupled to the ring 12 and having transverse arcuate grooves 18-21 for locking the connector within an electrical box 22, an internal stop wall 34 for retaining the conduit 28, resilient latch tabs 24-27 flexibly, resiliently and pivotally coupled to the ring 12 for retaining the conduit 28 within the connector 10, and transverse arms 62-65 coupled to the legs for protecting the electrical conductors 30.

The electrical box 22 houses suitable electrical devices to which conductors 30 are to be connected. Box 22 can be plastic or metallic; and has a circular aperture 23 in one wall in which connector 10 is received. The diameter of the aperture 23 is smaller than the outer diameter of legs 14-17 and substantially the same as the diameter of the arcuate grooves 18-21 at their bottoms as seen in FIGS. 1-5.

The non-metallic electrical conduit 28 is hollow, flexible, and comprises a corrugated outer surface 36 and a distal end 38. The outer surface 36 has a plurality of alternating rings 40 and valleys or annular grooves 42.

The connector 10 advantageously is molded of plastic, is one integral, unitary piece and may be used with either plastic or steel electric boxes 22, steel electric boxes being preferred in the industry. As seen in FIGS. 1-7, the connector is generally tubular having a longitudinal axis 44, a through passageway 46 extending along the longitudinal axis, a rear open end 48 and a front open end 50.

Figure 6:
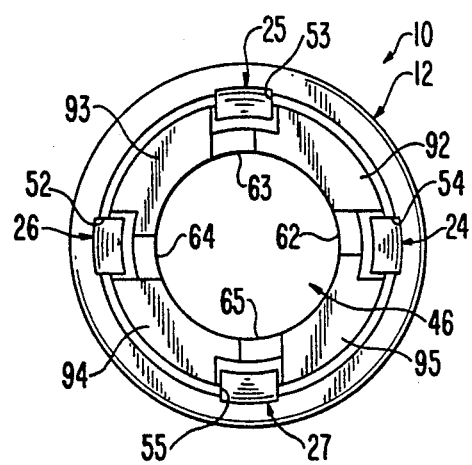
FIG. 6 is a rear elevational view of the connector of FIGS. 1-5.
Figure 7:
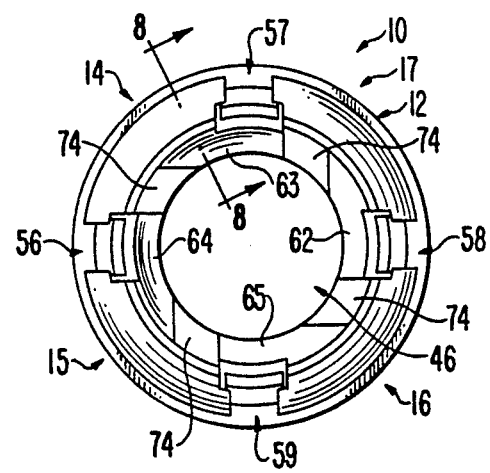
FIG. 7 is a front elevational view of the connector of FIGS. 1-5.

The ring 12 extends axially from the rear open end 48 toward the front open end 50 and comprises an inner wall 96 and an outer wall 98 as seen in FIGS. 3-4. The inner wall 96 has four recesses 52-55 as seen in FIG. 6. The ring 12 is comparatively thick relative to the other parts of the connector 10 except for those locations around the ring at which the recesses 52-55 are located. The recesses 52-55 are rectangular, extend about one-third the width of the ring 10 and are spaced every 90° around the ring evenly in alignment with the latch tabs 24-27 and axial slots 56-59 located between adjacent legs as seen in FIGS. 1-4 and 7.

The legs 14-17 are integrally, pivotally and resiliently coupled to the ring 12 with slots 56-59 spaced therebetween, respectively. The legs 14-17 are arcuate in transverse cross section, form a substantially circular array, and extend axially from the ring 12 toward the front open end 50 with an axial length substantially four times the axial length of the ring 12. Each slot 56-59 is spaced 90° apart from the adjacent slot and extends around and immediately above one latch tab 24-27.

Each leg is identical in structure, so for simplicity, only leg 14 will be referred to and described in detail hereinafter. But it should be understood that legs 15-17 have parts corresponding to those described in association with leg 14.

Figure 2:
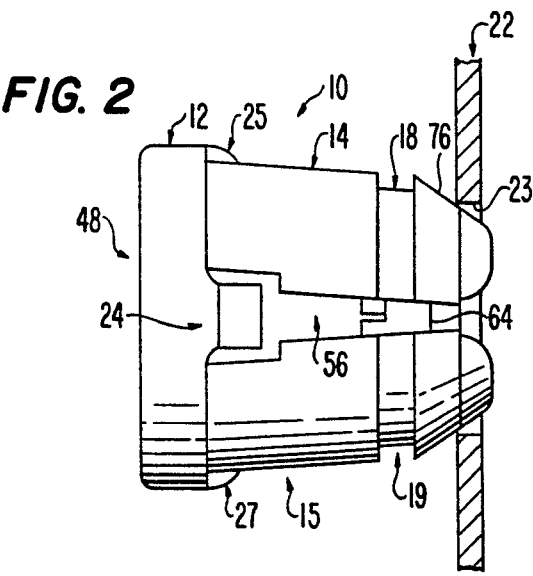
FIG. 2 is a elevational view of the connector shown in FIG. 1 being inserted into the electrical box.
Figure 8:
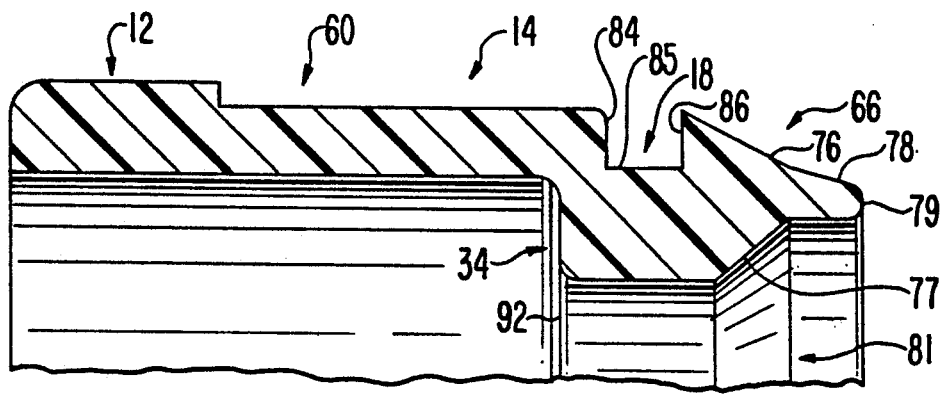
FIG. 8 is an enlarged partial side elevational view of the connector in transverse section taken along line 8—8 of FIG. 7.
Figure 9:
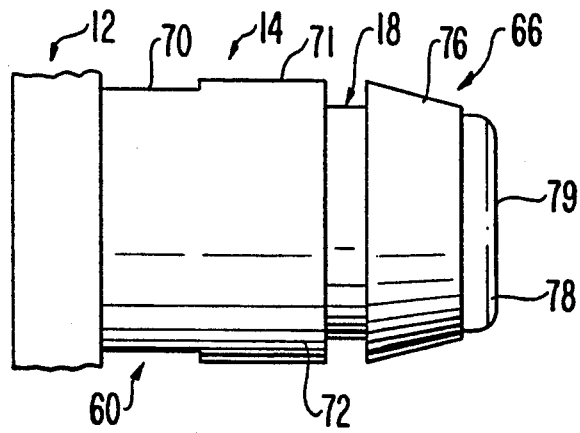
FIG. 9 is an enlarged partial top plan view of the outside of one leg attached to the ring of the connector shown in FIGS. 1-5.
Figure 10:
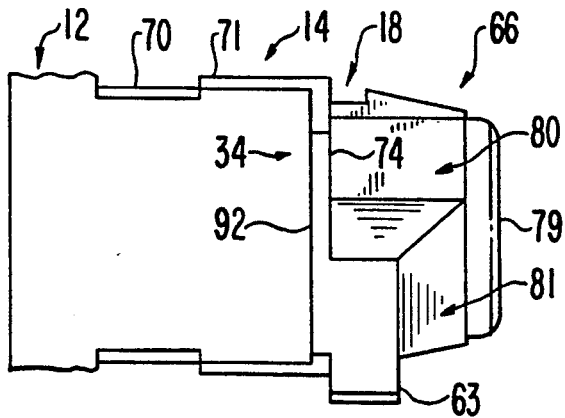
FIG. 10 is an enlarged partial bottom plan view of the inside of the leg shown in FIG. 9.

Leg 14, as seen in FIGS. 8-10, is comprised of an arcuate main body 60, an arcuate groove 18 and an arcuate mounting tooth 66. The main body 60 has first portion 70 and a second portion 71. The first portion 70 is integrally, pivotally and resiliently coupled to the ring 12 and extends from the ring 12 toward the front open end 50. The second portion 71 integrally extends from the first portion 70 toward the front open end 50 to the groove 18 and is slightly wider than the first portion 70, thereby allowing the latch tabs 24-27 to be integrally coupled to the ring 12 but spaced between each leg 14-17 as seen in FIGS. 1 and 2. The main body 60 thickness is slightly smaller than the ring 12 thickness allowing the main body 60 to resiliently pivot relative to the ring.

Arcuate groove 18 extends inwardly from the outer surface 72 of leg 14. Arcuate groove 18 is substantially U-shaped in transverse cross section and comprises axially facing first wall 84, radially outwardly facing second wall 85 and axially facing third wall 86. The first wall 84 and third wall 85 are perpendicular to the second wall 84. The outer diameter of the array of legs 14-17 is substantially 1.2 times larger than the diameter of the bottoms of the grooves 18-21 formed by the second wall.

Mounting tooth 66 extends integrally from the third wall 86 of arcuate groove 18 and comprises an outer inwardly tapered surface 76, an inner surface 77 and a tip 78. The outer surface 76 slops inwardly toward the longitudinal axis 44 and toward the front open end 50 until it unitarily and integrally connects with the tooth tip 78.

As seen in FIGS. 3-5 and 10, the inner surface of the leg has a recessed portion 80 and a projecting portion 81. The projecting portion 81 integrally couples one transverse arcuate arm 63 to leg 14, extends toward the front open end 50 and then slopes outwardly away from the longitudinal axis 44 until it integrally connects with the tooth tip 78. The recessed portion 80 is substantially rectangular and receives the next adjacent arm 64 therein. Below recessed portion 80 is an arcuate shelf 74 which slidably engages the next adjacent arm 64 when the legs are deflected radially inwardly, shelf 74 being an extension of projecting portion 81. The tooth tip 78 slopes inwardly toward the longitudinal axis 44 but at a lesser angle than the outer surface 76. Tooth tip 78 is thin relative to the other portions of the tooth 66 and forms distal edge 79.

One of arms 62-65, as best seen in FIGS. 1-7 and 10, is integrally and unitarily connected to the projecting portion 81 of each leg 14-17 and extends transversely from the projecting portion and spans the next adjacent slot 56-59. The arms 62-65 are substantially coplanar with the arcuate grooves 18-21. The arms serve to protect the electrical conductors 30 from being damaged by scraping against the aperture 23 of the electrical box 22.

As seen in FIG. 6, a stop wall 34 is formed by the axially rearwardly facing arcuate surfaces 92-95, each surface being formed in turn by the bottom of each shelf 74 and projecting portion 81 in each leg. The stop wall 34 extends radially inwardly toward the longitudinal axis 44 perpendicular to the distal end of the main body 60 of each leg and is interrupted by the slots 56-59. The inner diameter of the stop wall 34 is less than the inner diameter of the ring 12 and main body 60 of the legs 14-17. Stop wall 34 restrains the conduit from being inserted past the arcuate grooves and into electrical box aperture 23.

Latch tabs 24–27 are unitarily, resiliently and pivotally coupled at their base 82 to the ring 12, angle inwardly toward the longitudinal axis 44 and extend away from the rear open end 48 and ring 12 as seen in FIGS. 1–7. Preferably, one tab is coupled to the ring 12 at each recess 52–55 thereby making each tab more flexible. Latch tabs 24–27 are located, respectively, between two adjacent legs 14–17 on center with the slots 56–59 and the recesses 52–55 at 90° intervals.

Operation

As seen in FIGS. 1–5, the electrical box 22 receives the connector 10 therein, and thereafter, the conduit 28 is securely latched into position within the connector 10 with the electrical conductors 30 thereafter inserted through the conduit 28 and into the electrical box 22 for electrical connection to a suitable device located in the box.

Initially, as seen in FIG. 2, the connector 10 is aligned with aperture 23 so that tapered surfaces 76 on each leg 14–17 engage the edge of the aperture. The connector 10 is then pushed towards the aperture and the legs are biased inwardly as the tapered surfaces slidably engage the edge of the aperture. Since the legs are resiliently and pivotally coupled to the ring 12, and have slots 56–59 therebetween, the legs are easily biased radially inwardly without material fatigue or unusual force.

As seen in FIGS. 2 and 3, when inserting the connector 10 into the electrical box 22, each transverse arm 62–65 slidably engages the next adjacent shelf 74 as legs 14–17 deflect inwardly. When the arcuate grooves 18–21 are within the aperture 23 of electrical box 22, resilient legs 14–17 bias and deflect outwardly due to their resilient coupling with the ring, thereby engaging the arcuate grooves and the edge of the aperture 23 and locking connector 10 in position at the arcuate grooves.

Figure 5:
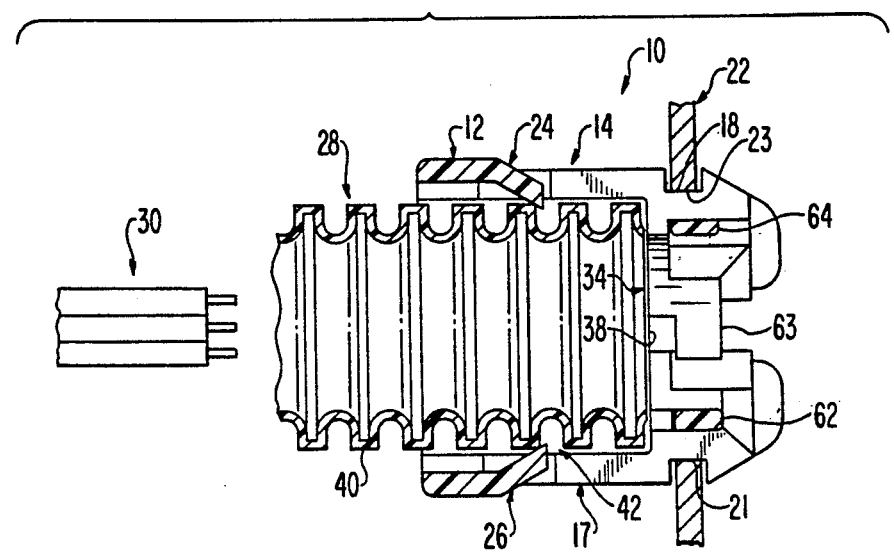
FIG. 5 is a side elevational view of the connector and conduit in longitudinal section taken along line 3—3 of FIG. 1 showing the conduit latched within the connector and with the electrical conductors about to be inserted within the conduit.

As seen in FIG. 4 and 5, the electrical conduit 28 can be fastened to the connector 10 by merely axially inserting the distal end 38 of the conduit through the ring 12 and into the legs 14–17 until it reaches the stop wall 34, the conduit 38 having a slightly smaller diameter than the ring 12. When fully inserted into the connector 10, the distal end 38 engages stop wall 34 and is securely held in position by resilient latch tabs 24–27, usually at the second groove 42. During insertion of the conduit 38, the latch tabs are sequentially biased outwardly by each ring 40, with the tabs acting as pawls and the rings 40 and grooves 42 in the conduit acting as a cylindrical ratchet.

As seen in FIG. 5, a plurality of electrical conductors 30 may then be inserted into the conduit 28 to extend past distal end 38 and into electrical box 22, transverse arms 62–65 protecting the conductors 30 from becoming damaged by the edge of aperture 23.

While the most advantageous embodiment has been chosen to illustrate the invention, it will be understood by those skilled in the art that various changes and modifications can be made therein without departing from the scope of the invention as defined in the appended claims.

What is claimed is:

1. A connector for attaching an electrical conduit to an enclosure comprising:
   a ring having a first end and a second end;
   a plurality of legs, each of said legs having a free end and a locking member thereon, said legs being spaced apart for defining a continuous slot between adjacent ones of said legs, each of said continuous slots extending from said second end of said ring to said free ends of said legs to completely separate adjacent ones of said legs;
   means, coupled to said ring and said legs, for pivotally and resiliently coupling said legs to said ring at said second end; and
   at least one retaining member coupled to said second end of said ring for retaining a conduit thereon;
   said at least one retaining member being located in one of said slots and angled inwardly relative to said ring and extending away from said ring.

2. The connector according to claim 1, wherein said retaining member comprises resilient tabs, each of said tabs having a base coupled to said ring.

3. The connector according to claim 2, wherein said resilient tabs comprise four resilient tabs, each tab being spaced 90° from the adjacent tab.

4. The connector according to claim 3, wherein said slots comprise four slots, each slot spaced 90° from the adjacent slot, and each slot receiving one of said tabs therein.

5. The connector according to claim 1, wherein said locking member on each of said legs comprise an arcuate groove.

6. The connector according to claim 1, wherein the axial length of said legs from said second end of said ring of said free ends of said legs is substantially four times the axial length of said ring from said first end to said second end of said ring.

7. The connector according to claim 1, wherein said legs comprise four of said legs and said slots comprise four of said slots.

8. The connector according to claim 1, wherein said locking member on each of said legs comprises an arcuate groove, said legs are arranged in a substantially circular array, and the outer diameter of said legs at the outer edge of said arcuate grooves is substantially 1.2 times larger than the diameter of the bottoms of said arcuate grooves.

9. The connector according to claim 1, wherein each of said legs has an arm rigidly coupled thereto and extending transversely from said leg and spanning one of the adjacent slots.

10. The connector according to claim 9, wherein said arms are substantially co-planar with said locking member.

11. The connector according to claim 9, wherein each of said legs has a shelf.

12. The connector according to claim 11, wherein each of said arms is slidably engageable with the shelf on the adjacent leg.

13. The connector according to claim 1, wherein said ring comprises inner and outer walls,
   said inner wall having four recesses spaced 90° apart,
   one of said recesses being centered immediately below each said resilient tabs.

14. The connector according to claim 1, wherein said legs include stop means for limiting insertion of the conduit therein.

15. A connector for coupling electrical conduit within an electrical box opening, comprising:
   a ring having a longitudinal axis, a first end and a second end;
   a plurality of legs defining a continuous slot between each adjacent pair of said legs, each of said legs having a free end, first and second opposing surfaces for locking the connector within the opening, and an arm rigidly coupled thereto, each of said arms being slidably engageable with the next adjacent leg and being aligned substantially between said first and second opposing surfaces and being substantially co-planar with said first and second opposing surfaces along a plane perpendicular to said longitudinal axis, one of said arms spanning each of said slots for protecting electrical conductors of the conduit from damage during insertion through the electrical box opening;

means, coupled to said ring and said legs, for pivotally and resiliently coupling said legs to said ring at said second end; and means, coupled to said ring, for retaining a conduit thereon and being located in said slots and angled inwardly relative to said ring and extending away from said ring.

16. The connector according to claim 15, wherein said means for retaining comprises resilient tabs, each of said tabs having a base coupled to said ring.

17. The connector according to claim 16, wherein said resilient tabs comprise four resilient tabs, each tab being spaced 90° from the adjacent tab.

18. The connector according to claim 17, wherein said slots comprise four slots, each slot spaced 90° from the adjacent slot and each slot receiving one of said resilient tabs therein.

19. The connector according to claim 15, wherein said first and second opposing surfaces on each of said legs comprises an arcuate groove.

20. The connector according to claim 15, wherein the axial length of said legs from said second end of said ring to said free ends of said legs is substantially four times the axial length of said ring from said first end to said second end of said ring.

21. The connector according to claim 15, wherein said legs comprise four of said legs and said slots comprise four of said slots.

22. The connector according to claim 15, wherein said first and second opposing surfaces on each of said legs comprises an arcuate groove, said legs are arranged in a substantially circular array, and the diameter of outer edges of said first and second opposing surfaces is substantially 1.2 times larger than the diameter of the bottoms of said arcuate grooves.

23. The connector according to claim 15, wherein said ring comprises inner and outer walls, said inner wall having four recesses spaced 90° apart, one of said recesses being centered immediately below each of said resilient tabs.

24. The connector according to claim 14, wherein each of said legs has a shelf rigidly coupled thereto and extending transversely thereon, each of said shelves slidably receiving one of said arms extending from the adjacent leg.

25. The connector according to claim 24, further comprising
a stop means formed on said legs for limiting insertion of the conduit and comprising a plurality of arcuate surfaces, each of said arcuate surfaces being rigidly coupled to each of said shelves.

* * * * *